Feb. 2, 1926.  
F. E. DENNISON  
REFRIGERATING APPARATUS  
Filed Sept. 10, 1923
1,571,660
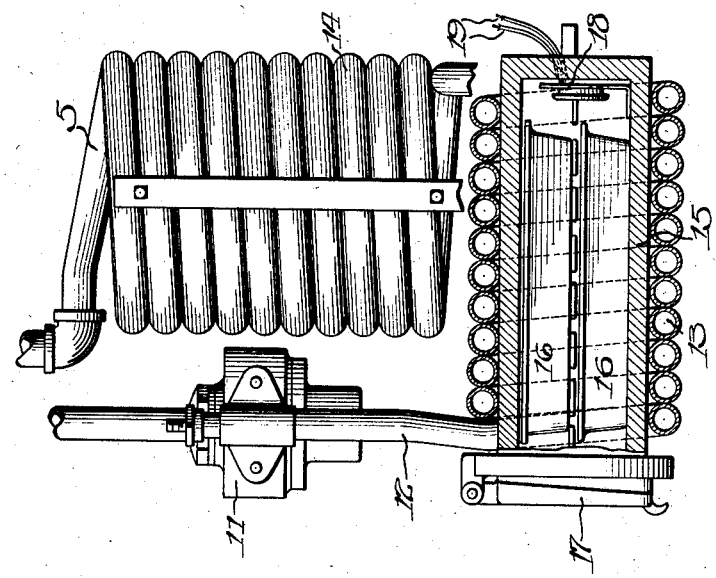
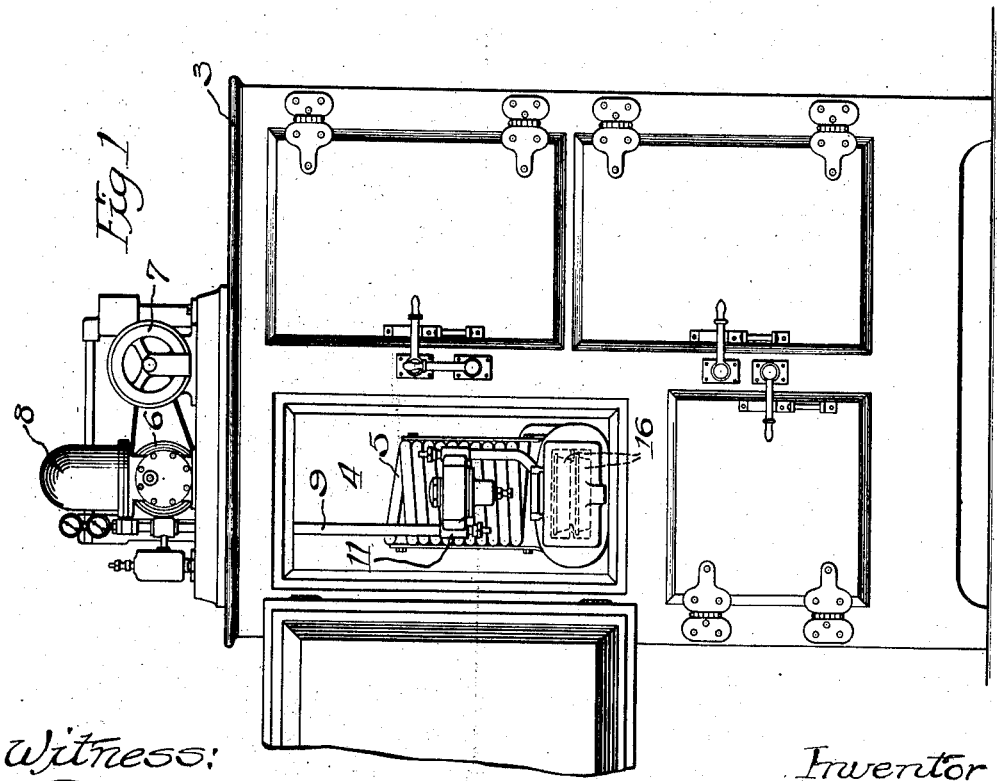
Witness:
Inventor  
French E. Dennison  
By Ira J. Wilson  
Atty.

Patented Feb. 2, 1926.

1,571,660

UNITED STATES PATENT OFFICE.

FRENCH E. DENNISON, OF BELOIT, WISCONSIN, ASSIGNOR TO LIPMAN REFRIGERATOR CAR & MANUFACTURING COMPANY, OF BELOIT, WISCONSIN, A CORPORATION OF DELAWARE.

REFRIGERATING APPARATUS.

Application filed September 10, 1923. Serial No. 661,742.

*To all whom it may concern:*

Be it known that I, FRENCH E. DENNISON, a citizen of the United States, residing at Beloit, in the county of Rock and State of Wisconsin, have invented certain new and useful Improvements in Refrigerating Apparatus, of which the following is a specification.

This invention pertains to refrigerating apparatus, and has particular reference to the thermostatic control therefor.

It has heretofore been customary in household and other relatively small refrigerating apparatuses, to locate within the cooling compartment a thermostat by which the operation of the refrigerating machine is controlled, so that as the temperature rises within the cooling compartment, the machine will be set in operation to perform refrigerating work, and when the temperature has again been reduced to a predetermined point, the machine will be stopped. Due to the frequent opening of the doors of the cooling compartment for the purpose of inserting and removing food products and other articles which it may be desirable to store in the cooling chamber, the fluctuations of temperature in the chamber are customarily quite rapid, the fluctuations being of course dependent upon the frequency with which the doors are opened, and upon the length of time that they are permitted to remain open.

One of the primary purposes of my present invention is to obviate the extremely frequent stopping and starting of the refrigerating machine which takes place when the control is positioned in the cooling compartment where it is subjected to the inrushing warm air each time the door of the compartment is opened; and with this end in view, my invention contemplates locating the thermostatic control inside a thick walled metal box or chamber, within which the temperature fluctuations are very slow. A sharp rise in temperature in the cooling compartment, induced by a warm inrush of air, will not therefore immediately affect the controlling device and start the operation of the refrigerating machine, but an opportunity will be given for the temperature within the compartment to become thoroughly equalized, and it is only when the temperature within the compartment has been sufficiently raised so that the heat will be radiated and conducted to the interior of the metal chamber that the refrigerating machine will be set in operation. When this condition has been reached, the machine will continue to operate for a considerable period of time until the temperature not only in the cooling compartment but in the metal chamber has been reduced to a predetermined point, whereupon the machine will be shut off again. By the use of my invention, therefore, the frequent startings and stoppings of the machine are dispensed with, thus reducing the amount of current employed and the cost of operation, and also reducing the wear upon the machine. The result is that the machine when once started operates for a considerable period of time; and when stopped remains idle for a considerable period of time. The life of the machine and its efficiency are therefore increased, and its cost of operation is reduced.

For the purpose of facilitating an understanding of my invention, I have illustrated on the accompanying drawings a preferred embodiment thereof.

Referring to the drawings:

Fig. 1 is an elevation of a machine embodying my invention; and

Fig. 2 is an enlarged elevation, partially in section, of the metal chamber, embraced by a portion of the refrigerating coil, showing the location of the controlling device.

Referring to the drawings more in detail, reference character 3 indicates generally a refrigerator of well known or preferred construction, providing the usual cooling compartment or compartments in which the articles to be preserved are stored, and a compartment 4 in which the expansion or cooling coils, indicated generally by reference character 5, are disposed.

The refrigerating machine may be of any preferred construction, the type illustrated comprising a compressor 6, operated from a motor 7, and a condenser 8, from which the condensed refrigerating medium, which may be ammonia, $CO_2$, or other suitable refrigerant, is conveyed through the pipe 9 to the expansion valve 11.

From the expansion valve, the refrigerating medium, which has passed the valve, is conducted through a pipe 12, coiled to provide a horizontally disposed coil 13 and a vertically disposed coil 14, these coils constituting the expansion or refrigerating coils through which the heat units from the cooling compartment are absorbed by the refrigerating medium within the coils.

The coil 13 comprises a number of convolutions surrounding and embracing a relatively thick walled metal box, forming a chamber in which the ice trays 16 are removably disposed. This box is preferably made of cast metal, the heat conductivity of which is such that when the interior thereof has become thoroughly cooled, a considerable lapse of time will be required to materially raise its temperature, even though the temperature of the surrounding air in the cooling compartment is relatively high. The front of the box is closed by a cast-iron door 17, which may be opened to permit access to the interior of the chamber for the insertion and removal of the ice trays.

By reason of the fact that this box is surrounded and embraced by the expansion coil 13, with the result that the interior of the box may be reduced to and maintained at a very low temperature, the construction is termed a "sharp freezer," and is designed for the production of ice cubes which may be quickly frozen in the trays 16. By reason of the fact that the chamber in which these trays are disposed is entirely enclosed by heavy cast-metal walls, the trays are not subjected to sudden changes of temperature resulting from the opening of the doors of the cooling compartment, and consequently the ice formed in the trays is not melted, even though the doors of the cooling compartment may be open for some time. The sharp freezer acts, therefore, as a storage reservoir to maintain a low temperature, and temperature fluctuations in the chamber are very much less than the fluctuations in the surrounding cooling compartment.

Instead, therefore, of locating the thermostatic control for the refrigerating mechanism in the cooling compartment, where it is subject to temperature fluctuations resulting from the opening of the doors of the compartment, and which fluctuations would normally cause the refrigerating machine to intermittently stop and start at relatively short intervals, my invention contemplates mounting the thermostatic controlling device, which is indicated on Fig. 2 by reference character 18, upon the inside of the cast-metal box 15. This thermostatic device may be of any approved construction, comprising an element or elements subject to expansion and contraction in accordance with temperature variations, and adapted to close an electric circuit when a predetermined maximum temperature within the sharp freezer has been reached, and to open said circuit when a predetermined minimum temperature in the freezer has been reached. The thermostatic device is connected by wires 19 in the circuit by which current is supplied to the motor 7, and the motor is therefore stopped and started as the circuit is opened and closed by the thermostatic device 18.

It will be apparent that the sharp freezer precludes rapid temperature fluctuations upon its interior; and since the thermostatic controlling device is located within the freezer, it will be actuated only when the temperature within the freezer reaches a predetermined maximum, or a predetermined minimum. Since a considerable period of time is under ordinary conditions required to produce this temperature range within the freezer, the intermittent operation of the refrigerating apparatus will take place at relatively long intervals, and the objections incident to repeated starting and stopping of the machine at short intervals in apparatus of this character are obviated. No claim is made herein to the thick walled metal chamber of the sharp freezer per se, since this forms part of the invention of Carl E. L. Lipman which has been disclosed and claimed in his copending application, Serial No. 657,216, filed August 20, 1923, for sharp freezers. The structural details of the apparatus are of course capable of wide modification and variation without exceeding the scope of the invention, as defined in the following claims.

I claim:

1. In a refrigerating apparatus, the combination of a thick walled metal chamber, a refrigerating coil embracing the exterior of said chamber, and a thermostatic control for said apparatus located within said chamber.

2. In a refrigerating apparatus, the combination of a thick walled cast iron box, a door for said box, a refrigerating coil embracing said box, said thick walled cast iron box possessing the characteristics of low heat conductivity and high thermal capacity, to thereby prevent rapid fluctuations of temperature within said box when there is a rise in temperature within the refrigerating apparatus, and a thermostatic controlling device located within the confines of said box.

3. A refrigerating apparatus, including a refrigerating chamber and a sharp freezer therein, said sharp freezer comprising a refrigerating coil and a chamber surrounded by the convolutions of said coil, the walls of said sharp freezer chamber being formed of thick cast metal possessing the characteristics of low heat conductivity and high thermal capacity, to thereby prevent rapid fluctuations in temperature within said sharp freezer chamber upon a rise in temperature within said refrigerating chamber, and a thermostatic controlling device for said refrigerating apparatus located within the confines of said sharp freezer chamber.

FRENCH E. DENNISON.